United States Patent
Sahara et al.

(10) Patent No.: US 11,874,364 B2
(45) Date of Patent: Jan. 16, 2024

(54) ELECTRONIC APPARATUS, CONTROL METHOD FOR ELECTRONIC APPARATUS, AND CONTROL PROGRAM FOR ELECTRONIC APPARATUS

(71) Applicant: KYOCERA Corporation, Kyoto (JP)

(72) Inventors: Tooru Sahara, Yokohama (JP); Masamitsu Nishikido, Yokohama (JP); Youhei Murakami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 302 days.

(21) Appl. No.: 17/279,238

(22) PCT Filed: Sep. 19, 2019

(86) PCT No.: PCT/JP2019/036766
§ 371 (c)(1),
(2) Date: Mar. 24, 2021

(87) PCT Pub. No.: WO2020/066838
PCT Pub. Date: Apr. 2, 2020

(65) Prior Publication Data
US 2022/0003858 A1    Jan. 6, 2022

(30) Foreign Application Priority Data

Sep. 27, 2018 (JP) .................................. 2018-182379

(51) Int. Cl.
*G01S 13/34* (2006.01)
*G01S 13/931* (2020.01)

(52) U.S. Cl.
CPC ............ *G01S 13/34* (2013.01); *G01S 13/931* (2013.01); *G01S 2013/93271* (2020.01)

(58) Field of Classification Search
CPC ................... G01S 13/34; G01S 13/931; G01S 2013/93271
See application file for complete search history.

(56) References Cited

U.S. PATENT DOCUMENTS

| 5,227,784 A | * | 7/1993 | Masamori | ............... G01S 17/66 340/901 |
| 6,429,804 B1 | * | 8/2002 | Kishida | ................... G01S 13/34 342/146 |

(Continued)

FOREIGN PATENT DOCUMENTS

| JP | S639875 A | 1/1988 |
| JP | H11133144 A | 5/1999 |

(Continued)

*Primary Examiner* — Peter M Bythrow
(74) *Attorney, Agent, or Firm* — Studebaker & Brackett PC

(57) ABSTRACT

An electronic apparatus includes a transmission unit, a reception unit, and a controller. The transmission unit transmits a transmission wave. The reception unit receives a reflected wave of the transmission wave reflected by an object. The controller operates the transmission unit in one of a plurality of operation modes having different detection distances. When the reflected wave is received by the reception unit, the controller determines a distance between the electronic apparatus and the object, based on the transmission wave and the reflected wave. The controller operates the transmission unit in an operation mode having the detection distance that includes the distance to the object and is the shortest, from among the plurality of operation modes.

9 Claims, 12 Drawing Sheets

(56) References Cited

U.S. PATENT DOCUMENTS

| | | | | |
|---|---|---|---|---|
| 6,700,529 B2* | 3/2004 | Matsuura | G01S 7/4811 | 342/158 |
| 7,151,479 B2* | 12/2006 | Beez | H01Q 1/3233 | 342/174 |
| 7,268,722 B2* | 9/2007 | Gottwald | H01Q 3/247 | 342/107 |
| 7,474,253 B2* | 1/2009 | Natsume | G08G 1/167 | 342/70 |
| 7,663,533 B2* | 2/2010 | Toennesen | H01Q 25/002 | 342/70 |
| 7,973,700 B2* | 7/2011 | Gohl | H01Q 3/24 | 342/195 |
| 8,344,940 B2* | 1/2013 | Jeong | G01S 7/4026 | 342/75 |
| 8,717,224 B2* | 5/2014 | Jeong | H01Q 5/42 | 342/93 |
| 8,902,103 B2* | 12/2014 | Kim | G01S 13/345 | 342/134 |
| 10,823,836 B2* | 11/2020 | Wintermantel | G01S 13/584 | |
| 2003/0112172 A1* | 6/2003 | Shinoda | G01S 13/4463 | 342/149 |
| 2003/0164791 A1* | 9/2003 | Shinoda | H01Q 3/2605 | 342/149 |
| 2006/0267764 A1* | 11/2006 | Morinaga | G06V 40/103 | 342/28 |
| 2006/0284760 A1* | 12/2006 | Natsume | G08G 1/167 | 342/72 |
| 2014/0306840 A1* | 10/2014 | Koerber | G01S 13/422 | 342/107 |
| 2016/0238694 A1* | 8/2016 | Kishigami | G01S 7/0233 | |
| 2017/0309997 A1* | 10/2017 | Alland | H01Q 21/29 | |
| 2018/0120427 A1* | 5/2018 | Cornic | G01S 13/343 | |
| 2018/0151958 A1* | 5/2018 | Lim | H01Q 21/0006 | |
| 2018/0284216 A1* | 10/2018 | Aoki | H01Q 21/06 | |
| 2019/0187247 A1* | 6/2019 | Izadian | G01S 13/931 | |

FOREIGN PATENT DOCUMENTS

| | | | |
|---|---|---|---|
| JP | H11258340 A | | 9/1999 |
| JP | 2003121542 A | | 4/2003 |
| JP | 2003222673 A | | 8/2003 |
| JP | 2003-255044 A | | 9/2003 |
| JP | 2006-349456 A | | 12/2006 |
| JP | 2006329912 A | | 12/2006 |
| JP | 2007022280 A | | 2/2007 |
| JP | 2009276076 A | | 11/2009 |
| JP | 2018169366 A | * | 11/2018 |

* cited by examiner

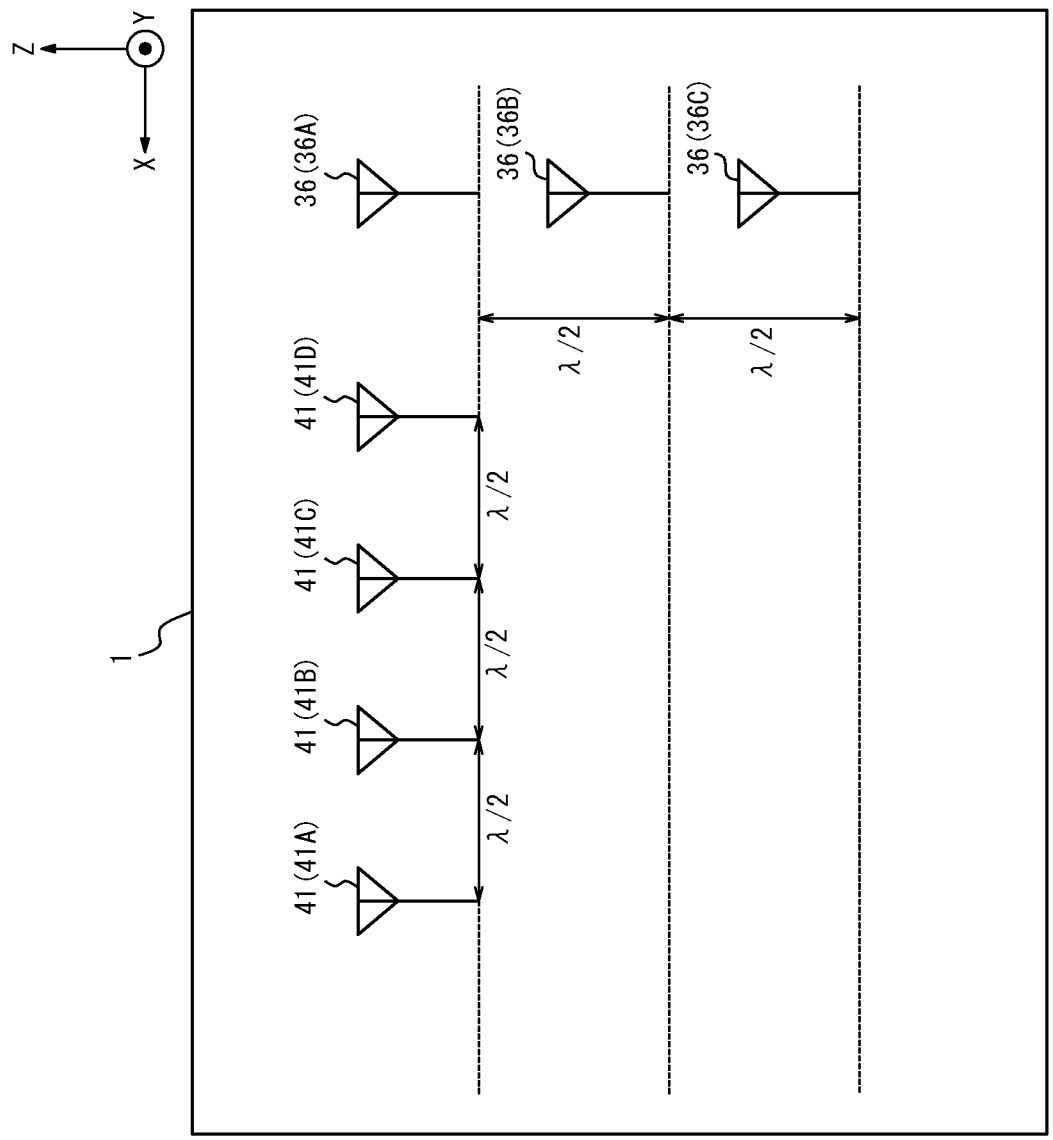

ELECTRONIC APPARATUS, CONTROL METHOD FOR ELECTRONIC APPARATUS, AND CONTROL PROGRAM FOR ELECTRONIC APPARATUS

CROSS REFERENCE TO RELATED APPLICATION

This application claims priority to and the benefit of Japanese Patent Application No. 2018-182379 filed on Sep. 27, 2018, the entire contents of which are incorporated herein by reference.

TECHNICAL FIELD

The present disclosure relates to an electronic apparatus, a control method for the electronic apparatus, and a control program for the electronic apparatus.

BACKGROUND

Conventionally, a technique for detecting an object using radio waves and measure a distance to the object or a relative speed with respect to the object is known. For example, a method is known in which an FMCW radar (Frequency Modulated Continuous Wave radar) uses a transmission wave having two different modulation bandwidths to change a non-detection region and detect an object in the non-detection region.

SUMMARY

An electronic apparatus according to an embodiment of the present disclosure includes a transmission unit, a reception unit, and a controller. The transmission unit is configured to transmit a transmission wave. The reception unit is configured to receive a reflected wave of the transmission wave reflected by an object. The controller is configured to operate the transmission unit in one of a plurality of operation modes having different detection distances. When the reception unit receives the reflected wave, the controller determines a distance between the electronic apparatus and the object, based on the transmission wave and the reflected wave. The controller operates the transmission unit in an operation mode having the detection distance that includes the distance to the object and is the shortest, from among the plurality of operation modes.

A control method for an electronic apparatus according to an embodiment of the present disclosure is a control method for an electronic apparatus that includes a transmission unit, a reception unit, and a controller. The control method includes a step in which the controller transmits a transmission wave from the transmission unit in one of a plurality of operation modes having different detection distances. The control method includes a step in which the controller determines whether the reception unit has received a reflected wave of the transmission wave reflected by an object. The control method includes a step in which, when the reception unit receives the reflected wave, the controller determines a distance between the electronic apparatus and the object, based on the transmission wave and the reflected wave. The control method includes a step in which, when the reception unit receives the reflected wave, the controller operates the transmission unit in an operation mode having the detection distance that includes the distance to the object and is the shortest, from among the plurality of operation modes.

A control program for an electronic apparatus according to an embodiment of the present disclosure is a control program for an electronic apparatus that includes a transmission unit, a reception unit, and a controller. The control program causes the electronic apparatus to execute a step of transmitting a transmission wave from the transmission unit in one of a plurality of operation modes having different detection distances. The control program causes the electronic apparatus to execute a step of determining whether the reception unit has received a reflected wave of the transmission wave reflected by an object. The control program causes the electronic apparatus to execute, when the reception unit receives the reflection wave, a step of determining a distance between the electronic apparatus and the object, based on the transmission wave and the reflected wave. The control program causes the electronic apparatus, when the reception unit receives the reflected wave, to execute a step of operating the transmission unit in an operation mode having the detection distance that includes the distance to the object and is the shortest, from among the plurality of operation modes.

BRIEF DESCRIPTION OF THE DRAWINGS

In the accompanying drawings:

FIG. 12 is a diagram illustrating a layout of antennas of the electronic apparatus according to the another embodiment of the present disclosure.

DETAILED DESCRIPTION

Figure 1:
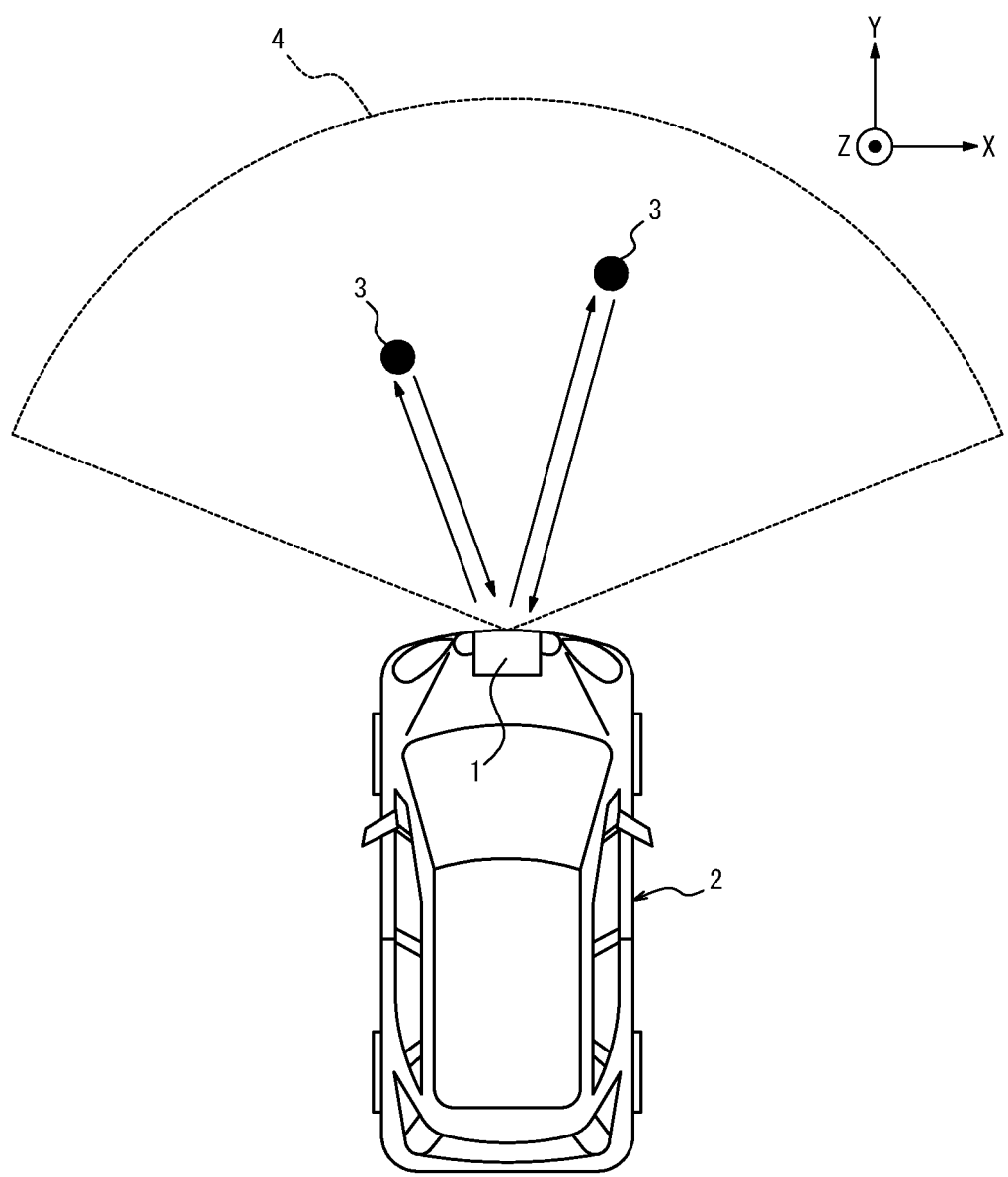
FIG. 1 is a diagram illustrating a usage mode of an electronic apparatus according to an embodiment of the present disclosure.

A technology for detecting an object using radio waves is desired to further improve the usefulness thereof. An object of the present disclosure is to provide an electronic apparatus capable of improving the usefulness of the technique for detecting an object using radio waves, a control method for the electronic apparatus, and a control program for the electronic apparatus. According to the electronic apparatus, the control method for the electronic apparatus, and the control program for the electronic apparatus according to an embodiment of the present disclosure, the usefulness of the technique for detecting an object using radio waves is improved.

Hereinafter, the embodiment of the present disclosure will be described in detail with reference to the drawings.

An electronic apparatus 1 according to the embodiment of the present disclosure is mounted on a vehicle 2 such as, for example, an automobile. The electronic apparatus 1 transmits a transmission wave. A target space 4 in which the transmission wave is transmitted is schematically indicated by chain lines in FIG. 1. Although the target space 4 expands in a fan shape centered on the electronic apparatus 1 in FIG. 1, this is not restrictive. When an object 3 is present in the target space 4, the transmission wave is reflected by the object 3. The object 3 includes another vehicle, a person, an obstacle, or the like. The electronic apparatus 1 receives a reflected wave of the transmission wave reflected by the object 3. The electronic apparatus 1 detects the object 3 present in the target space 4 by receiving the reflected wave. The electronic apparatus 1 further measures a distance between the object 3 and the electronic apparatus 1, based on the transmission wave and the reflected wave. The object 3 may be at least one of, for example, an oncoming vehicle traveling in an adjacent lane of the mobile body 2, a vehicle traveling in parallel with the mobile body 2, and a vehicle traveling ahead of or behind the mobile body 2 in the same lane. The object 3 may be any object located around the mobile body 2, such as a motorcycle, a bicycle, a stroller, a pedestrian, a guardrail, a median strip, a road sign, a step on a sidewalk, a wall, an obstacle, or the like. Further, the object 3 may be moving or stopped. For example, the object 3 may be an automobile parked or pulled over in the vicinity of the mobile body 2. In the present disclosure, the object 3 to be detected by the electronic apparatus 1 includes an organic matter such as a human or an animal, in addition to an inorganic matter. An object 3 to be detected by the electronic apparatus 1 of the present disclosure includes a target including a person, an object, an animal, or the like to be detected by a radar technology.

The electronic apparatus 1 may be capable of transmitting a plurality of types of transmission waves having different detection distances. In the present disclosure, a maximum value of a distance the transmission wave can detect a predetermined object within a predetermined accuracy range will be referred to as the detection distance of the transmission wave. The target space 4 increases as the detection distance increases. Generally, it is known than the detection distance and a resolution has a trade-off relation. That is, the longer the detection distance of the electronic apparatus 1, the wider the target space 4, and the lower the resolution of the electronic apparatus 1. On the other hand, the shorter the detection distance of the electronic apparatus 1, the narrower the target space 4, and the higher the resolution of the electronic apparatus 1.

The electronic apparatus 1 selects and transmits one of a plurality of types of transmission waves having different detection distances. When the object 3 is detected, the electronic apparatus 1 changes a transmission wave to be transmitted to a transmission wave having the detection distance that includes the object 3 and has the highest resolution, from among the plurality of types of the transmission waves.

The vehicle 2 is a mobile body having the electronic apparatus 1 mounted thereon. The vehicle 2 may include an automobile, a bus, a truck, a motorcycle, or the like. Although in the present disclosure the electronic apparatus 1 is mounted on the vehicle 2 by way of example, this is not restrictive. For example, the electronic apparatus 1 may be mounted on a mobile body other than the vehicle 2, such as a bicycle, a drone, a ship, an aircraft, a robot, a pedestrian, or the like. The electronic apparatus 1 is not limited to be mounted on a mobile body and may be mounted on any object other than a mobile body, or may be installed at any position, rather than being mounted on an object. The mobile body having the electronic apparatus 1 according to the embodiment mounted thereon is not necessarily limited to a mobile body that moves using its own power. For example, the mobile body having the electronic apparatus according to the embodiment mounted thereon may be a trailer towed by a tractor or the like. In one embodiment, the electronic apparatus 1 may be installed inside a bumper of the vehicle 2 in a manner such that the electronic apparatus 1 is not visible in the appearance of the vehicle 2. An installation position of the electronic apparatus 1 in the vehicle 2 may be either on the outside or inside of the vehicle 2. The inside of the vehicle 2 includes, for example, the inside of the body, the bumper, the headlight, or the cabin, or any combination thereof. Further, the number of the electronic apparatuses 1 mounted on the mobile body is not limited to one and may be any number more than 1.

Typically, the electronic apparatus 1 may be a radar (RADAR, Radio Detecting and Ranging) that transmits and receives radio waves. For example, the electronic apparatus 1 may be an FMCW radar that uses frequency-modulated continuous waves whose frequency continuously changes with time. In the present disclosure, the electronic apparatus 1 will be described to be the FMCW radar. However, the electronic apparatus 1 is not limited to the radar. The electronic apparatus 1 according to the embodiment may be, for example, a lidar (LIDAR, Light Detection and Ranging, Laser Imaging Detection and Ranging) that uses light waves. Alternatively, the electronic apparatus 1 according to the embodiment may be, for example, a sonar (SONAR, Sound Navigation and Ranging) that uses sound waves. Further, the electronic apparatus 1 is not limited to the above apparatuses and may be any apparatus. For example, the electronic apparatus 1 may be any information processing apparatus including an in-vehicle apparatus, a car navigation system, a mobile phone, a smartphone, a tablet computer, a PC (Personal Computer), or the like.

Figure 2:
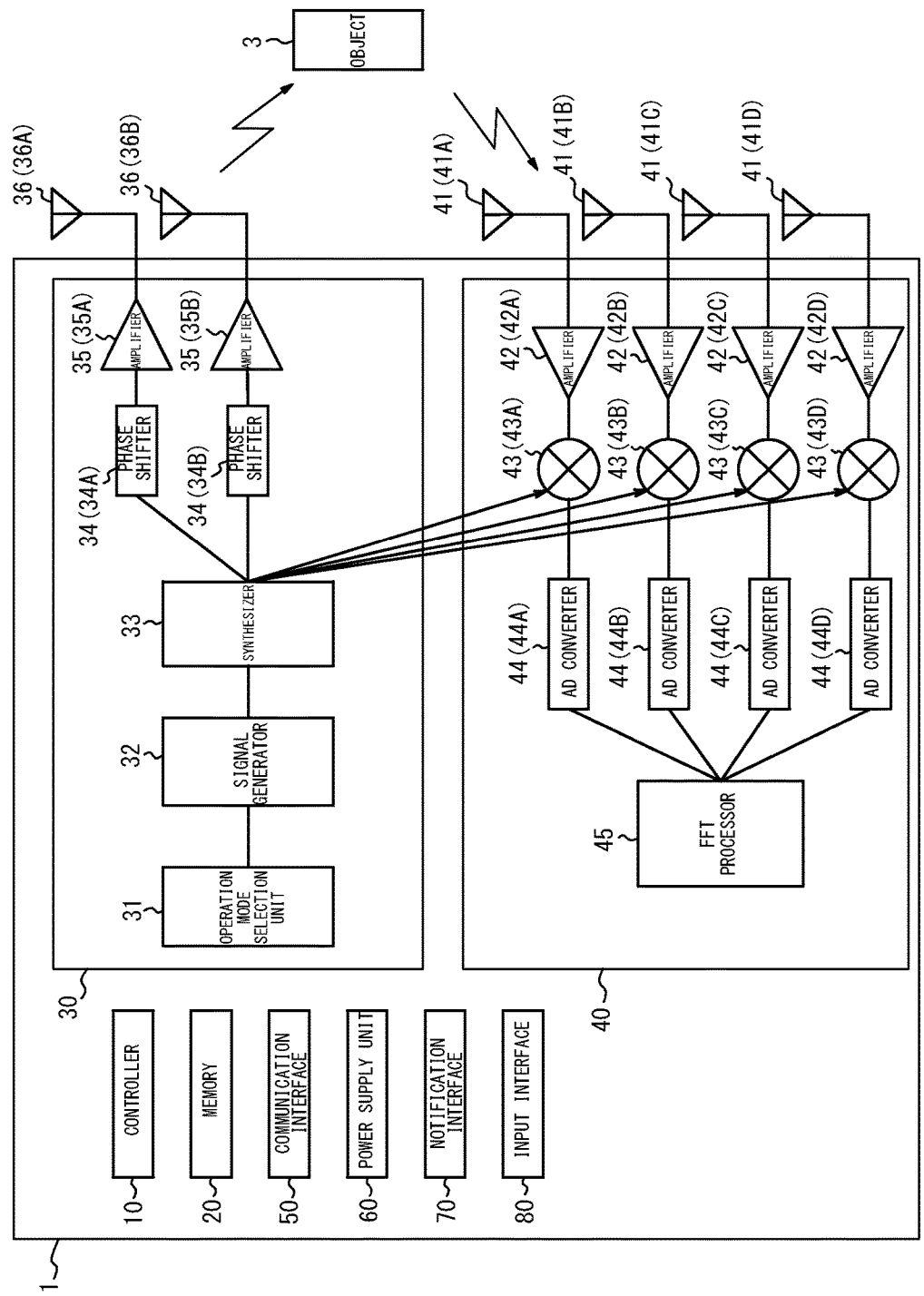
FIG. 2 is a schematic diagram illustrating a configuration of the electronic apparatus according to the embodiment of the present disclosure.

Hereinafter, a configuration of the electronic apparatus 1 according to the embodiment will be described. FIG. 2 is a functional block diagram schematically illustrating the configuration of the electronic apparatus 1 according to the embodiment. As illustrated in FIG. 2, the electronic apparatus 1 according to the embodiment includes a controller 10, a memory 20, a transmission unit 30, a reception unit 40, a communication interface 50, a power supply unit 60, a notification interface 70, and an input interface 80. The controller 10 is electrically connected to the memory 20, the transmission unit 30, the reception unit 40, the communication interface 50, the power supply unit 60, the notification interface 70, and the input interface 80.

The controller 10 includes at least one processor to provide control and processing power for performing various functions. The controller 10 may control the memory 20, the transmission unit 30, the reception unit 40, the communication interface 50, the power supply unit 60, the notification interface 70, and the input interface 80 to realize functions thereof, which will be described later. The processor may include a processor such as a CPU (Central Processor) configured to execute a program that defines a control procedure, or a specialized processor dedicated to a specific process. The processor may be implemented as one integrated circuit. The integrated circuit is also referred to as an IC (Integrated Circuit). The processor may be implemented as a plurality of communicably connected integrated circuits and discrete circuits. The processor may be implemented based on various other known techniques. An operation of the controller 10 will be further described later.

The memory 20 stores information, programs, and the like used for an operation to control each function of the electronic apparatus 1. The memory 20 may be, for example, a semiconductor memory, a magnetic memory, an optical memory, or the like. The memory 20 may function as, for example, a main storage device or an auxiliary storage device. The memory 20 may be a cache memory or the like included in the controller 10. The memory 20 may be a volatile storage device or a non-volatile storage device. In the present embodiment, the memory 20 may store, for example, "information regarding operation mode" to be used to operate the transmission unit 30 in a plurality of operation modes having different detection distances, "information regarding transmission wave" transmitted to an outside from the transmission unit 30, or the like.

The transmission unit 30 transmits a transmission wave. The transmission unit 30 includes an operation mode selection unit 31, a signal generator 32, a synthesizer 33, a phase shifter 34, a transmission amplifier 35, and a transmission antenna 36. Hereinafter, an operation to transmit the transmission wave performed by the transmission unit 30 using these elements will be described.

The operation mode selection unit 31 selects an operation mode of the transmission unit 30 from a plurality of operation modes, based on the control by the controller 10. The plurality of operation modes may be operation modes having different detection distances. The present disclosure will be described using an example in which the plurality of operation modes having different detection distances include three operation modes; a medium range radar (MRR, middle range radar), a short range radar (SRR), and an ultra short range radar (MRR), in a descending order of the detection distance. In each operation mode a transmission wave having a different detection distance may be transmitted from the transmission unit 30. The operation mode selection unit 31 may receive a signal that specifies one of the plurality of operation modes from the controller 10. The operation mode selection unit 31 may control such that the transmission unit 30 operates in the specified operation mode, based on the signal received from the controller 10. From the memory 20, the operation mode selection unit 31 may acquire information regarding the operation mode to be used when another function included in the transmission unit 30 operates in the specified mode. The operation mode selection unit 31 may transmit the specified operation mode and the information regarding the operation mode acquired from the memory 20 to the signal generator 32.

The detection distances of the plurality of operation modes described above may be, for example, approximately 50 meters for the medium-range radar, approximately 25 meters for the short-range radar, and approximately 10 meters for the ultra-short-range radar. In a case in which the electronic apparatus 1 is the FMCW radar, the detection distance and the resolution in a plurality of operation modes have the trade-off relation. That is, as the detection distance of the electronic apparatus 1 is increased, the resolution of the electronic apparatus 1 is reduced. Also, as the detection distance of the electronic apparatus 1 is reduced, the resolution of the electronic apparatus 1 is increased. Thus, the resolution is higher in the order of medium-range radar, short-range radar, and ultra-short-range radar. Note that in the present disclosure the resolution may include at least one of a distance resolution, a velocity resolution, and an angular resolution. The longer the detection distance, received radio waves may become more susceptible to a noise and the like. An influence by the noise may affect the resolution.

Figure 3:
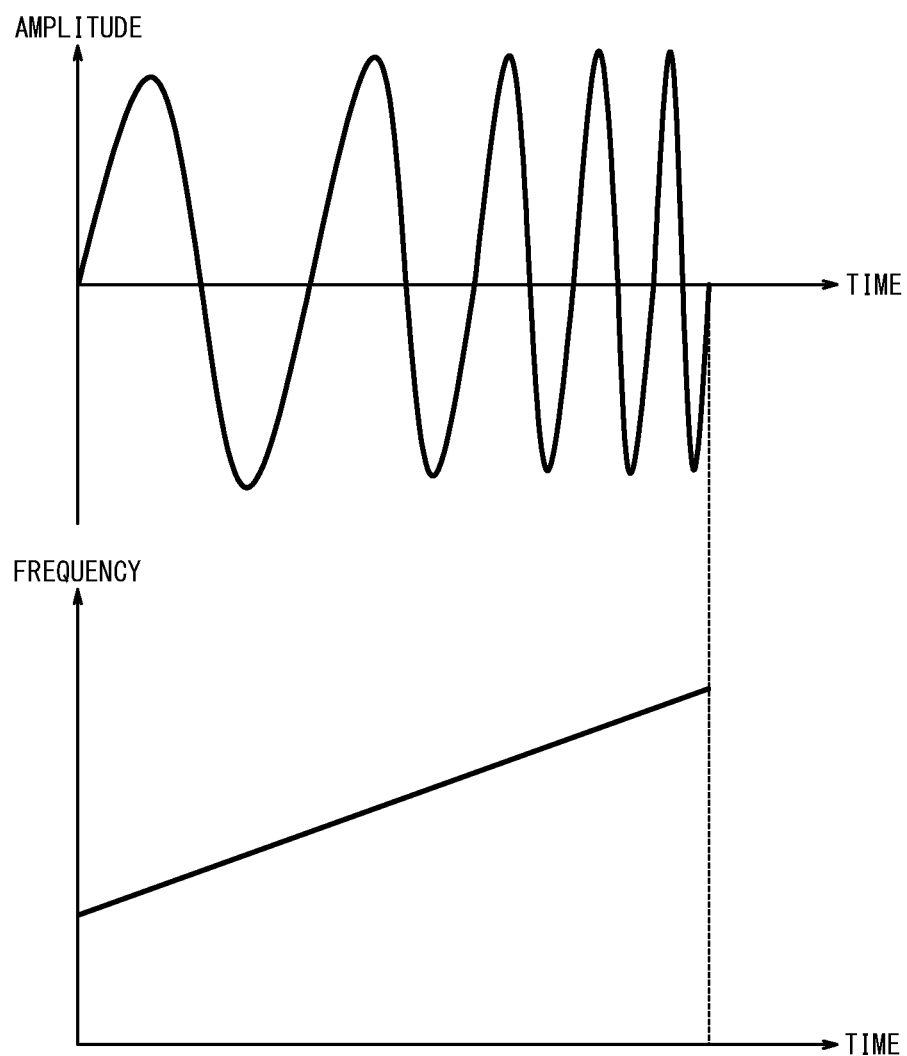
FIG. 3 is a diagram illustrating a transmission wave transmitted by the electronic apparatus according to the embodiment of the present disclosure.

The signal generator 32 generates a transmission signal, based on the operation mode received from the operation mode selection unit 31. The transmission signal may be a chirp signal. The chirp signal is a signal whose frequency continuously changes with time. FIG. 3 illustrates a chirp signal whose frequency increases linearly with time. The chirp signal is also referred to as a frequency-modulated continuous wave (FMCW). The change in the frequency of the chirp signal may include an increase, a decrease, or a combination thereof. The chirp signal may include a linear chirp signal whose frequency linearly changes with time, an exponential chirp signal whose frequency exponentially changes with time, or the like. In a case in which the transmission signal is the chirp signal, parameters such as a start frequency, an end wave number, a duration, and the like serving as information used to generate the chirp signal in each operation mode may be stored as the information regarding the operation mode in the memory 20. However, the signal generated by the signal generator 32 is not limited to the FMCW signal. The signal generated by the signal generator 32 may be a signal of various methods including, for example, a pulse method, a pulse compression method (a spread spectrum method), a frequency CW (Continuous Wave) method, or the like. In a case in which a distance is measured using a millimeter-wave radar, a frequency-modulated continuous wave radar (hereinafter, referred to as FMCW radar (Frequency Modulated Continuous Wave radar)) is commonly used. The FMCW radar generates a transmission signal by sweeping a frequency of radio waves to be transmitted. Thus, for example, in a millimeter-wave FMCW radar that uses radio waves in a frequency band of 79 GHz, a frequency of radio waves to be used has a frequency bandwidth of 4 GHz, e.g., from 77 GHz to 81 GHz. The radar in the frequency band of 79 GHz is characterized by having a wider usable frequency bandwidth than other millimeter-wave radar and quasi-millimeter-wave radar having a frequency band such as 24 GHz, 60 GHz, or 76 GHz. Hereinafter, such an embodiment will be described. An FMCW radar system used in the present disclosure may include an FCM system (Fast-Chirp Modulation) that transmits a chirp signal at a shorter cycle than usual. The signal generated by the signal generator 32 is not limited to the FMCW signal. The signal generated by the signal generator 32 may be a signal of various systems other than the FMCW system. A transmission signal sequence stored in the memory 20 may be different according to the various systems. For example, in a case in which the FMCW radar signal as described above is used, a signal whose frequency increases and a signal whose frequency decreases for each time sample may be used. Because the various methods described above can appropriately apply known techniques, more detailed descriptions thereof will be omitted.

In a case in which the electronic apparatus 1 uses, for example, a millimeter-wave radar in a 79 GHz band, it is specified that the 4 GHz band allocated to the band from 77 GHz to 81 GHz is used. In this case, the signal generator 32 may generate a chirp signal that has a starting frequency of 77 GHz and an ending frequency of 81 GHz and linearly increases from 77 GHz to 81 GHz in a predetermined time, in a certain operation mode. In another operation mode, further, the signal generator 32 may generate a chirp signal that has a starting frequency of 79 GHz and an ending frequency of 81 GHz and linearly increases from 79 GHz to 81 GHz in a predetermined time. The transmission signal generated by the signal generator 32 is supplied to the synthesizer 33.

With reference to FIG. 2 again, the synthesizer 33 may be an oscillator circuit using electronic high frequency synthesis that generates an AC signal, based on the transmission signal generated by the signal generator 32. In a case in which the transmission unit 30 includes a plurality of transmission antennas 36, the synthesizer 33 may generate the same AC signal or different AC signals for each of the plurality of transmission antennas 36. The synthesizer 33 may select a particular transmission antenna 36 from among the plurality of transmission antennas 36 to generate the AC signal. The synthesizer 33 may determine the transmission antenna 36 for transmitting the transmission wave, a phase shift amount of the transmission wave, and the like, based on the operation mode specified by the controller 10. Information regarding the transmission antenna 36 for transmitting the transmission wave in each operation mode, the phase shift amount of the transmission wave, and the like may be stored as the information regarding the operation mode in the memory 20.

The synthesizer 33 may transmit information for identifying the generated AC signal as the information regarding the transmission wave to the mixer 43 of the reception unit 40, which will be described later. Alternatively, the synthesizer 33 may store the information for identifying the generated AC signal as the information regarding the transmission wave in the memory 20, such that the mixer 43 can refer to it. Thus, the mixer 43 can use the information regarding the transmission wave.

The phase shifter 34 outputs an AC signal whose phase is shifted with respect to the AC signal generated by the synthesizer 33. The amount of the phase shifting may correspond to the phase shift amount determined by the synthesizer 33. In a case in which the transmission unit 30 includes a plurality of transmission antennas 36, the phase shifter 34 may be provided for each of the plurality of transmission antennas 36. FIG. 2 illustrates two phase shifters 34A and 34B, by way of example. Beamforming may be performed by the plurality of transmission antennas 36 by outputting the AC signal having a phase shifted by at least one of the plurality of phase shifters 34.

The transmission amplifier 35 amplifies the AC signal output from the phase shifter 34 and outputs thus obtained signal to the transmission antenna 36. The transmission amplifier 35 is also referred to as a power amplifier (PA, power amplifier). In a case in which the transmission unit 30 includes a plurality of transmission antennas 36, the transmission amplifier 35 may be provided for each of the plurality of transmission antennas 36. FIG. 2 illustrates two transmission amplifiers 35A and 35B, by way of example. The transmission signal amplified by the transmission amplifier 35 is transmitted as a transmission wave from the transmission antenna 36.

The transmission antenna 36 transmits a transmission wave whose intensity is controlled based on the transmission signal input from the transmission amplifier 35. For example, the transmission wave may be millimeter waves of radio waves having a wavelength of 1 to 10 mm and a frequency of 30 to 300 GHz. Alternatively, the transmission wave may be quasi-millimeter waves of radio waves having a frequency of 20 to 30 GHz. The transmission wave is not limited to the radio waves such as the millimeter waves or the like and may include radio waves, light, electromagnetic waves, ultrasonic waves, or the like having any wavelength and frequency. A plurality of transmission antennas 36 may be provided. FIG. 2 illustrates an example in which the transmission unit 30 includes two transmission antennas 36A and 36B. The transmission antennas 36A and 36B may be the same type or different types of antennas. In the present disclosure, three or more transmission antennas may be provided. For example, to direct a beam downward, two or more antennas are arranged in the vertical direction and a phase control thereof is performed, whereby switching to a downward beam may be realized. Vertically arranging two antennas and performing beam control thereof can be more advantageous in terms of space saving than vertically arranging three or more antennas for the beam control.

In a case in which the transmission unit 30 includes a plurality of transmission antennas 36, a directivity of the transmission wave may be controlled by controlling the transmission of the transmission wave to be transmitted from the transmission antennas 36. For example, the transmission unit 30 may perform beamforming by controlling the directivity of the transmission wave by controlling at least one phase of the plurality of transmission antennas 36. Hereinafter, when the transmission antennas 36A and 36B are not distinguished from each other, they will be simply collectively referred to as "transmission antenna 36". Further, the number of transmission antennas 36 is not limited to that illustrated in FIG. 2 and may be any number determined according to the usage of the electronic apparatus 1 or the like.

The reception unit 40 receives the reflected wave of the transmission wave that is transmitted from the transmission unit 30 and reflected by the object 3. The reception unit 40 includes a reception antenna 41, a reception amplifier 42, a mixer 43, an AD converter (Analog Digital converter) 44, and an FFT processor (Fast Fourier Transform processor) 45. Hereinafter, an operation of the reception unit 40 using the above elements to receive the reflected wave from the object 3 will be described.

The reception antenna 41 outputs a voltage or a current according to an intensity of a received incident wave. A signal generated by the voltage or the current output by the reception antenna 41 will also be referred to as a reception signal. The reception antenna 41 outputs the reception signal according to the incident wave to the reception amplifier 42. The incident wave includes a reflected wave of the transmission wave reflected by the object 3. The reflected wave may include radio waves, light, electromagnetic waves, ultrasonic waves, or the like. A plurality of reception antennas 41 may be provided. FIG. 2 illustrates an example in which the reception unit 40 includes four reception antennas 41A, 41B, 41C and 41D. The reception antennas 41A, 41B, 41C and 41D may be the same type or different types of antennas. Hereinafter, when the reception antennas 41A, 41B, 41C and 41D are not distinguished from each other, they will be simply collectively referred to as "reception antenna 41". Further, the number of the reception antennas 41 is not limited to that illustrated in FIG. 2 and may be any number determined according to the usage of the electronic apparatus 1 or the like.

The reception amplifier 42 may be, for example, a low noise amplifier (LNA). The reception amplifier 42 amplifies the reception signal received from the reception antenna 41 with low noise. In a case in which the reception unit 40 includes a plurality of reception antennas 41, the reception amplifier 42 may be provided for each of the plurality of reception antennas 41. FIG. 2 illustrates four reception amplifiers 42A, 42B, 42C and 42D, by way of example. The reception signal amplified by the reception amplifier 42 is supplied to the mixer 43.

The mixer 43 generates an intermediate frequency (IF) signal by multiplying the reception signal supplied from the reception amplifier 42 with the transmission signal generated by the synthesizer 33. The IF signal is also referred to as a beat signal. In a case in which the reception unit 40 includes a plurality of reception antennas 41, the mixer 43 may be provided for each of the reception antennas 41. FIG. 2 illustrates four mixers 43A, 43B, 43C and 43D, by way of example. The IF signal having a frequency converted by the mixer 43 is supplied to an AD converter 44.

The AD converter 44 may be composed of any analog-to-digital conversion circuit (ADC, Analog to Digital Converter). The AD converter 44 digitizes an analog IF signal supplied from the mixer 43. In a case in which the reception unit 40 includes a plurality of reception antennas 41, the AD converter 44 may be provided for each of the reception antennas 41. FIG. 2 illustrates four AD converters 44A, 44B, 44C and 44D, by way of example. The IF signal digitized by the AD converter 44 is supplied to an FFT processor 45.

The FFT processor 45 may be composed of any circuit or chip that performs fast Fourier transform (FFT, Fast Fourier Transform) processing. The FFT processor 45 performs the FFT processing on the IF signal digitized by the AD converter 44. A frequency spectrum is obtained as a result of the FFT processing of the IF signal performed by the FFT processor 45. Based on the frequency spectrum thus obtained, the FFT processor 45 can determine whether the object 3 is present within the detection distance of the transmission wave transmitted by the electronic apparatus 1. The FFT processor 45 may perform a Fourier transform other than the fast Fourier transform.

The FFT processor 45 may determine a distance between the object 3 and the electronic apparatus 1. When a peak included in the frequency spectrum described above is equal to or greater than a predetermined threshold value, the FFT processor 45 may determine that the object 3 is located at a distance corresponding to the peak. The FFT processor 45 may further determine a relative speed of the object 3 with respect to the electronic apparatus 1. The FFT processor 45 may further calculate a phase spectrum by performing the FFT processing on the calculated frequency spectrum. When the peak of the phase spectrum is equal to or greater than a predetermined threshold, the FFT processor 45 may determine that the speed corresponding to the peak is the relative speed of the object 3 with respect to the electronic apparatus 1.

Figure 5:
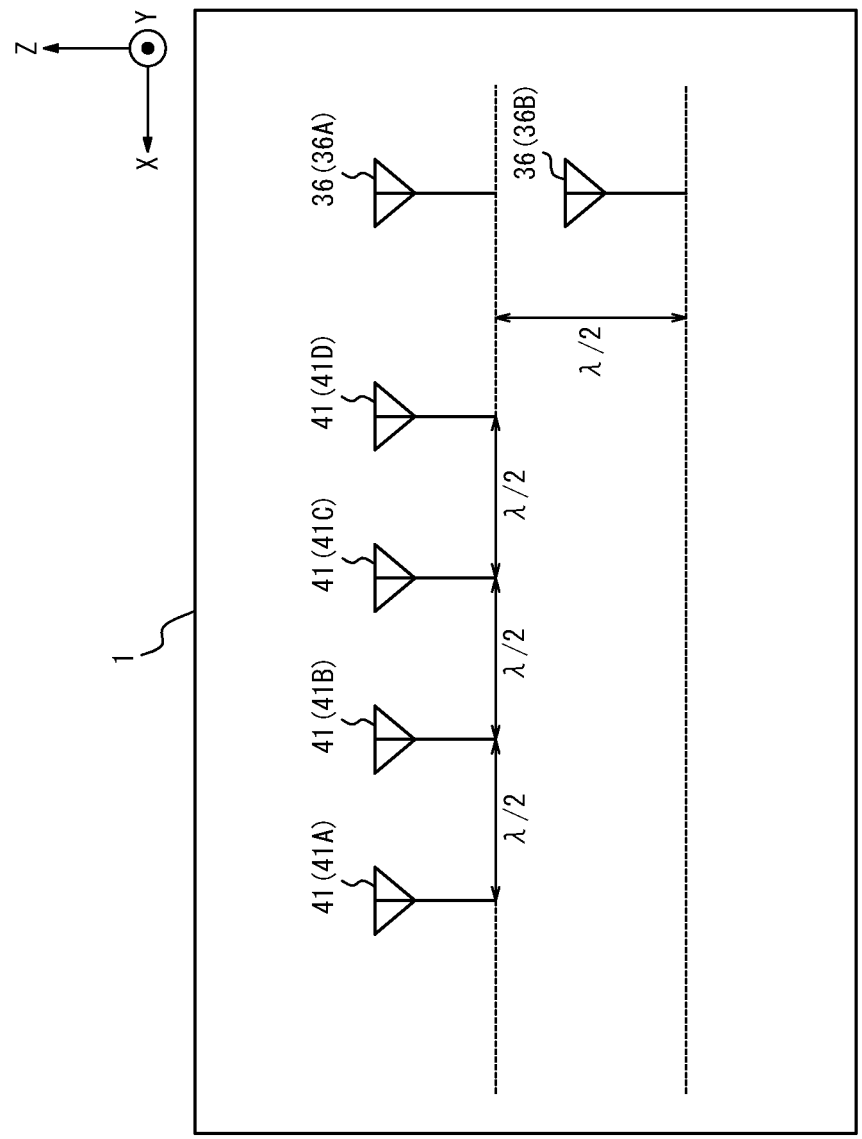
FIG. 5 is a diagram illustrating a layout of antennas of the electronic apparatus according to the embodiment of the present disclosure.

The FFT processor 45 may determine an angle of the object 3 with respect to the electronic apparatus 1. The FFT processor 45 may determine an arrival angle of the reflected wave from the object 3, based on a difference in results obtained by performing the FFT processing on the reception signal acquired from each of the plurality of the reception antennas 41 installed at different locations. For example, FIG. 5 illustrates an example layout of the antennas viewed from the front side of the electronic apparatus 1. In FIG. 5, the reception antennas 41 are arranged side by side in the lateral direction (an X-axis direction) at intervals of $\lambda/2$. The FFT processor 45 may determine the arrival angle of the reflected wave, based on the difference in the results of the FFT processing performed based on the reflected wave received by each of the reception antennas 41. Thus, the FFT processor 45 can determine that the object 3 is present in a direction of the arrival angle of the reflected wave from the electronic apparatus 1.

With reference to FIG. 2 again, the communication interface 50 communicates with each element of the electronic apparatus 1 and an external apparatus external to the electronic apparatus 1, based on the control by the controller 10. The communication interface 50 may include, for example, a wired LAN (Local Area Network) communication module, a wireless LAN communication module, a CAN (Controller Area Network) communication module, a short-range wireless communication module such as Bluetooth® (Bluetooth is a registered trademark in Japan, other countries, or both), or the like. The communication performed by the communication interface 50 between the external device and the electronic apparatus 1 may be wired or wireless communication, or a combination thereof. The external apparatus may be any information processing apparatus such as, for example, an in-vehicle FFT process, a car navigation system, a mobile phone, a smartphone, a tablet computer, a PC (Personal Computer), or the like. The communication interface 50 may receive, for example, a signal including information such as an instruction to start a detection operation or an operation mode from the external apparatus.

The power supply unit 60 supplies electric power to be used for the operation of the electronic apparatus 1. The power supply unit 60 may be, for example, a dry battery, a storage battery, or the like. The power supply unit 60 may include, for example, an adapter or the like for receiving power supply from an external power source and receive power supply from the external power source.

The notification interface 70 notifies information using a sound, a vibration, light, an image, or the like, based on the control by the controller 10. The notification interface 70 may include at least one of, for example, a speaker, an oscillator, a light, a display device, and the like. The display device may be, for example, a liquid crystal display, an organic EL display, or the like. Based on the control by the controller 10, the notification interface 70 may notify the operation mode of the electronic apparatus 1, the presence/absence of the object 3, the distance between the electronic apparatus 1 and the object 3, the relative speed and angle of the object 3 with respect to the electronic apparatus 1, or the like. For example, when it is determined that the object 3 is present within the detection distance of the electronic apparatus 1, the notification interface 70 may notify a user that the object 3 is detected, by generating a sound or turning the light on.

The input interface 80 receives an input operation from the user. The input interface 80 may include at least one of a mechanical key such as a power button, an input device such as a touch panel provided integrally with the display device of the notification interface 70, and a pointing device such as a mouse. Upon an input operation in respect to the input interface 80 performed by the user, the input interface 80 transmits the input operation as electronic information to the controller 10. The input operation may include, for example, the instruction to start the detection operation.

Hereinafter, the control on the transmission unit 30 and the reception unit 40 performed by the controller 10 described above will be described. The controller 10 may repeat the control on the transmission unit 30 and the reception unit 40 on a frame-by-frame basis. The controller 10 may preliminarily store the number of frames for repeating the control as a predetermined number of frames in the memory 20. In this case, the controller 10 may repeat the transmission of the transmission waves from the start of the transmission of the transmission wave until the predetermined number of frames is reached and then end the transmission of the transmission wave. A length of one frame may be a predetermined time. A start time or an end time of the frame may be associated with a time set at a predetermined interval. Each frame may be provided continuously within a predetermined period. Each frame may be provided discretely within the predetermined period. The frames may be provided at predetermined intervals. The controller 10 may control in one frame or repeat controlling in a plurality of frames such that the transmission unit 30 transmits the transmission wave and the reception unit 40 receives the reflected wave.

The controller 10 operates the transmission unit 30 in one of the plurality of operation modes having different detection distances. The controller 10 may transmit a signal specifying one of the three operation modes such as, for example, the medium-range radar, the short-range radar, and the ultra-short-range radar, to the operation mode selection unit 31 such that the transmission unit 30 operates in the specified operation mode. Thus, the transmission unit 30 operates in the specified operation mode and transmits the transmission wave.

The controller 10 may determine whether the reception unit 40 has received the reflected wave of the transmission wave transmitted from the transmission unit 30 and reflected by the object 3. The controller 10 may operate the transmission unit 30 in one of the plurality of operation modes according to a determination result. When the reception unit 40 receives the reflected wave from the object 3, the controller 10 causes the reception unit 40 to determine the distance between the electronic apparatus 1 and the object 3, based on the transmission wave and the reflected wave. The controller 10 may select an operation mode for operating the transmission unit 30, based on the distance to the determined object 3. When the reception unit 40 receives the reflected wave from the object 3, the controller 10 may operate the transmission unit 30 in an operation mode having the detection distance that includes the distance to the object and is the shortest, from among the plurality of operation modes. For example, the detection distances of the three operation modes: the medium-range radar, the short-range radar, and the ultra-short-range radar are assumed to be respectively approximately 50 meters, approximately 25 meters, and approximately 10 meters, as described above. When the controller 10 determines that the distance between the electronic apparatus 1 and the object 3 is 30 meters, the controller 10 may operate the transmission unit 30 in the operation mode of the medium-range radar having the shortest detection distance, from among the operation modes having a detection distance of 30 meters or more. Then, when the controller 10 determines that the distance between the electronic apparatus 1 and the object 3 is 11 meters, the controller 10 may operate the transmission unit 30 in the operation mode of the short-range radar having the shortest detection distance, from among the operation modes having a detection distance of 11 meters or more.

As illustrated in FIG. 1, for example, when the reception unit 40 receives reflected waves from a plurality of objects 3, the controller 10 may determine the distance between the electronic apparatus 1 and the plurality of objects 3 using any one or more of distances between the electronic apparatus 1 and the plurality of objects 3. For example, the controller 10 may determine the shortest distance between the electronic apparatus 1 and the plurality of objects 3 to be the distance between the electronic apparatus 1 and the object 3.

When the reception unit 40 does not receive the reflected wave from the object 3, the controller 10 may operate the transmission unit 30 in the operation mode having the longest detection distance, from among the plurality of operation modes. For example, the controller 10 may operate the transmission unit 30 in the operation mode of the medium-range radar having the longest detection distance, from among the operation modes of the medium-range radar, the short-range radar, and the ultra-short-range radar.

The controller 10 may determine whether the reception unit 40 has received the reflected wave from the object 3, at a predetermined timing. The controller 10 may perform the determination whether the reflected wave is received, either one time or periodically. For example, the timing at which the controller 10 determines whether the reflected wave is received may be at predetermined time intervals or every time a predetermined process is executed. For example, the controller 10 may perform the determination in one or more frames described above. Alternatively, the controller 10 may perform the determination every time the transmission wave is transmitted from the transmission unit 30. For example, the controller 10 may transmit a signal wave from the transmission unit 30 in each frame in a predetermined operation mode and determine whether the reception unit 40 has received the reflected wave from the object 3. The controller 10 may determine the operation mode to transmit the signal wave from the transmission unit 30 in a subsequent frame, based on a determination result.

The controller 10 may control a plurality of the transmission antennas 36 according to the operation mode of the transmission unit 30 to control the directivity of the transmission wave transmitted from the transmission unit 30. When the controller 10 operates the transmission unit 30 in one of the plurality of operation modes having different detection distances, the controller 10 may control the directivity of the transmission wave transmitted from the transmission unit 30, based on the detection distance of the operation mode. The controller 10 may control the directivity of the transmission wave, such that the shorter the detection distance of the operation mode, the larger the angle in a downward direction with respect to a horizontal direction. For example, in each operation mode the controller 10 may transmit the transmission wave in the downward direction with respect to the horizontal direction, such that the transmission wave reaches the ground at a point that is remote from the electronic apparatus 1 in the horizontal direction by the detection distance.

Figure 4:
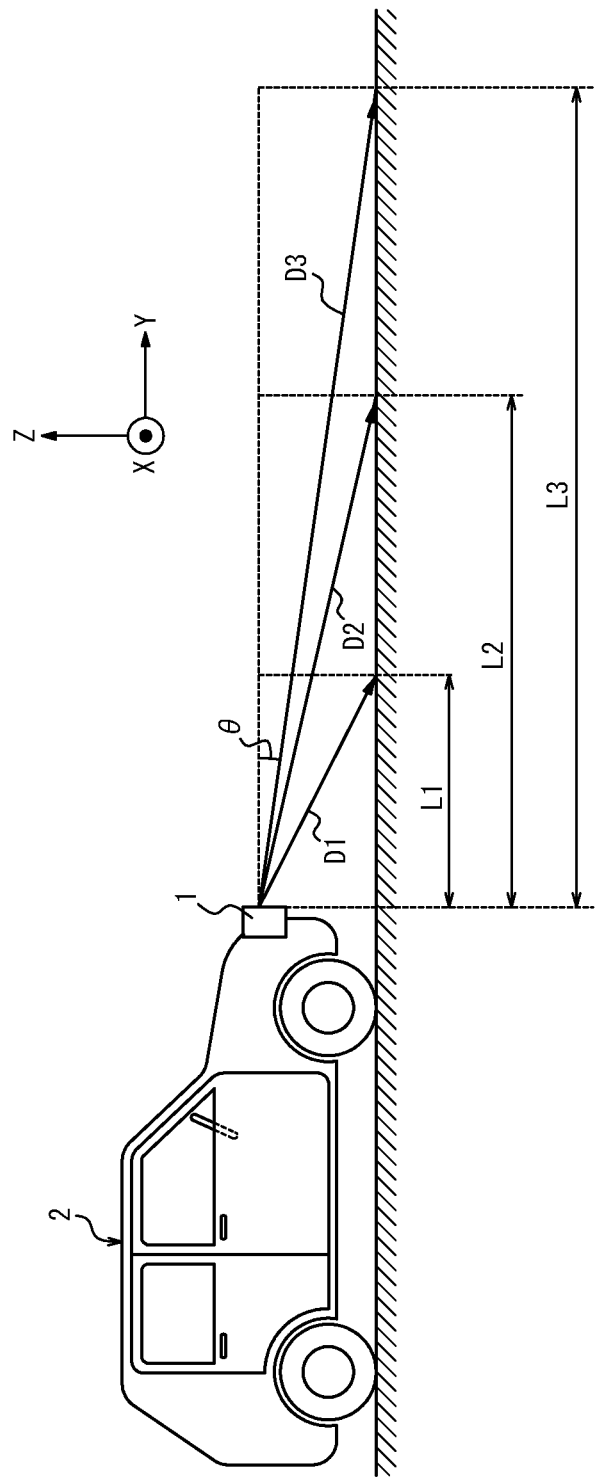
FIG. 4 is a diagram illustrating an operation of the electronic apparatus according to the embodiment of the present disclosure.

FIG. 4 is a diagram schematically illustrating the directivities of the transmission waves transmitted from the electronic apparatus 1 mounted on the front side of the vehicle 2 illustrated in FIG. 1. The detection distances of the three operation modes of the ultra-short-range radar, the short-range radar, and the medium-range radar are respectively indicated as L1, L2, and L3. In FIG. 4, the transmission waves of the ultra-short-range radar, the short-range radar, and the medium-range radar are transmitted to reach the ground at points respectively remote from the electronic apparatus 1 in the horizontal direction (a Y-axis direction) by L1, L2, and L3. Thus, the directivities of the transmission waves of the ultra-short-range radar, the short-range radar, and the medium-range radar are controlled to be respectively directed in a first direction D1, a second direction D2, and a third direction D3. The transmission waves of the ultrashort-range radar, the short-range radar, and the medium-range radar may be transmitted in an approximately horizontal direction with respect to the ground. That is, in the present disclosure, provided that a direction directed to the ground is the downward direction with respect to the horizontal direction, the transmission waves may be transmitted in the downward direction, the horizontal direction, or an upward direction. Further, the transmission waves may be transmitted in a direction in combination of any one of the above directions.

In the electronic apparatus 1 according to the embodiment of the present disclosure, a plurality of transmission antennas 36 may be arranged side by side in the vertical direction. The controller 10 may control the directivity of the transmission wave by controlling at least one phase of the transmission waves transmitted from the plurality of transmission antennas 36 and performing beamforming in the downward direction with respect to the horizontal direction. The plurality of transmission antennas 36 may include two or more transmission antennas.

FIG. 5 illustrates a layout of the antennas viewed from the front side of the electronic apparatus 1. FIG. 5 illustrates two transmission antennas 36 and four reception antennas 41 included in the electronic apparatus 1 illustrated in FIG. 2. The transmission antennas 36A and 36B are arranged having a predetermined gap therebetween in the vertical direction (a Z-axis direction). The controller 10 performs beamforming by controlling at least one phase of the transmission waves transmitted from the plurality of transmission antennas 36 arranged side by side in the vertical direction. The controller 10 can perform beamforming by controlling an angle θ of the transmission direction of the transmission wave with respect to the horizontal direction, as illustrated in FIG. 4. Thus, the controller 10 may control the transmission wave such that it is directed in one of the first direction D1, the second direction D2, and the third direction D3. The plurality of transmission antennas 36 may be arranged at intervals of λ/2 in the vertical direction. This configuration can reduce sidelobes of the transmission antenna 36 in the vertical direction and enables beamforming as desired. Although two transmission antennas are illustrated in FIG. 5, the number of antennas used for the beamforming may be any number of two or more.

An example of the operation executed by the electronic apparatus 1 according to the embodiment of the present disclosure will be described with reference to FIG. 6 to FIG. 9.

Figure 6:
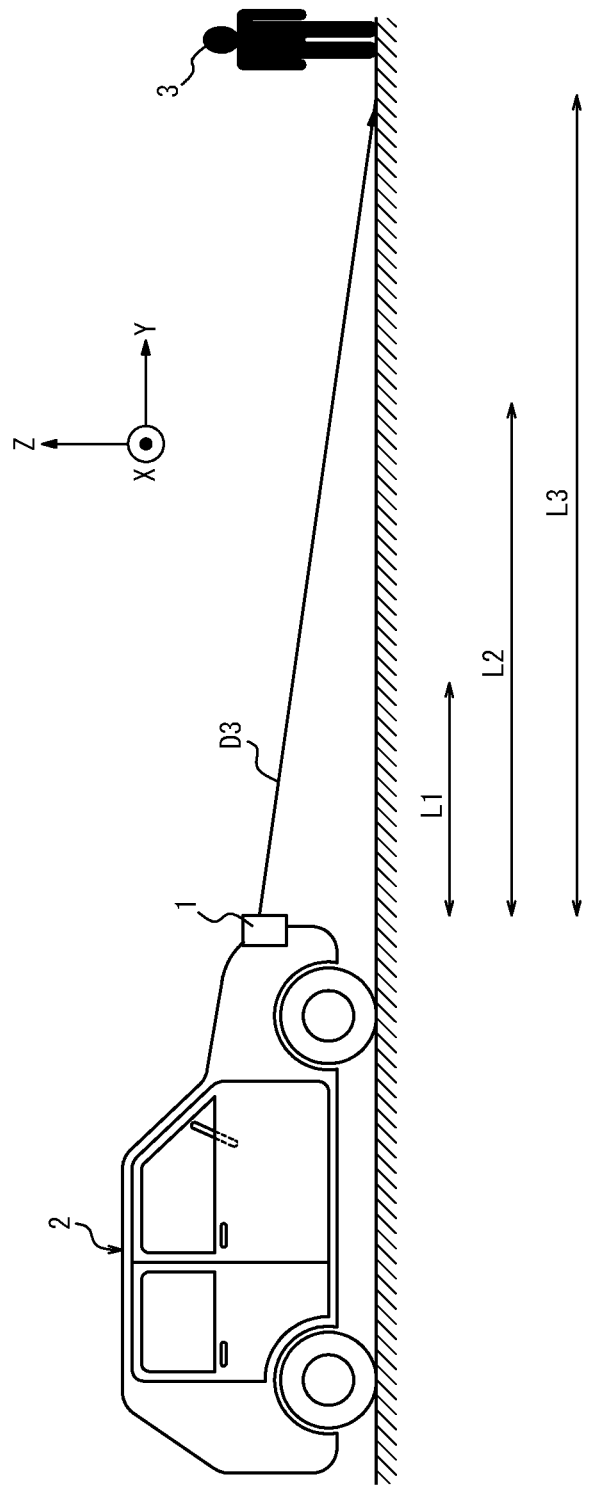
FIG. 6 is a diagram illustrating a flow of an operation of the electronic apparatus according to the embodiment of the present disclosure.

In FIG. 6 to FIG. 9, the electronic apparatus 1 is installed on the front side of the vehicle 2 illustrated in FIG. 1. The electronic apparatus 1 starts the operation, for example, upon user operation or the like. When the electronic apparatus 1 starts the operation, it transmits a transmission wave in each frame. First, the electronic apparatus 1 operates in the operation mode of the medium-range radar having the longest detection distance, from among the three operation modes of the medium-range radar, the short-range radar, and the ultra-short-range radar. As illustrated in FIG. 6, at a first time point, the electronic apparatus 1 transmits the transmission wave from the transmission unit 30 in the third direction D3 in the operation mode of the medium-range radar. The electronic apparatus 1 determines whether the reception unit 40 has received the reflected wave from the object 3. In FIG. 6, the object 3 is not present within the detection distance L3 in the horizontal direction (the Y-axis direction) from the electronic apparatus 1. Thus, the electronic apparatus 1 does not receive the reflected wave from the object 3 at the reception unit 40. In this case, the electronic apparatus 1 maintains the operation mode of the medium-range radar and transmits the transmission wave from the transmission unit 30 in the third direction D3 in subsequent frames.

Figure 7:
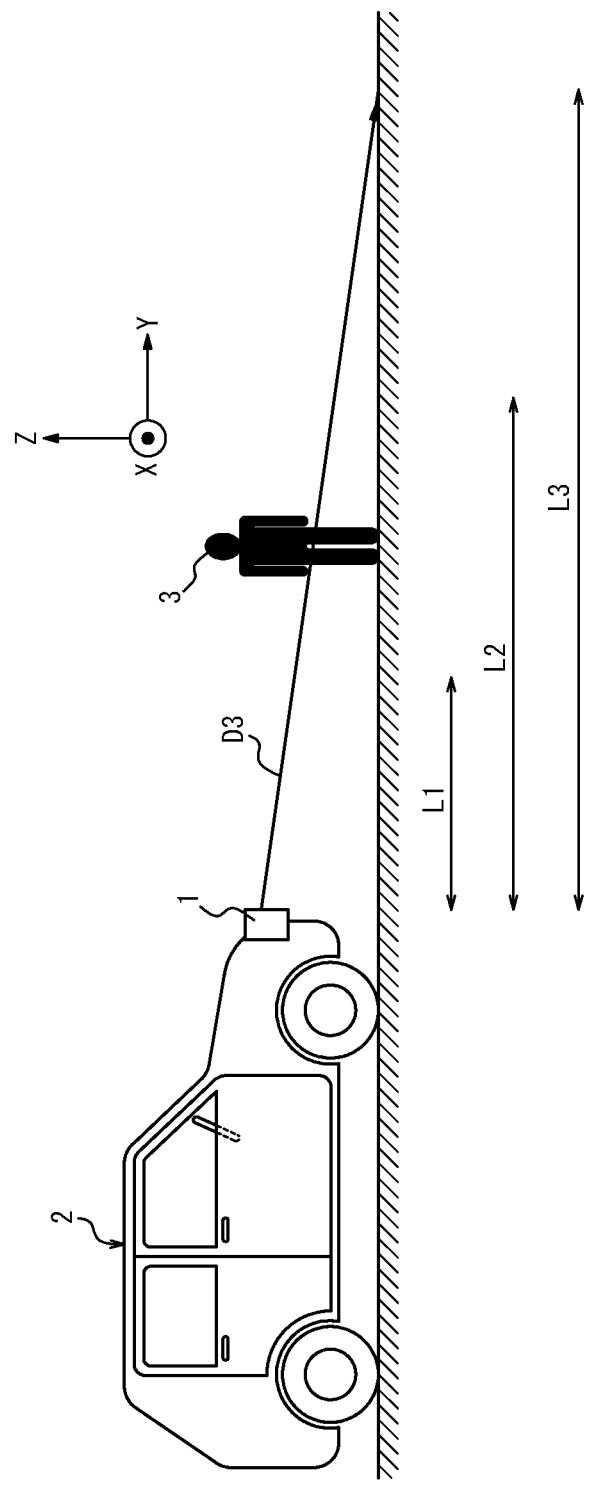
FIG. 7 is a diagram illustrating a flow of an operation of the electronic apparatus according to the embodiment of the present disclosure.

At a second time point, the electronic apparatus 1 transmits the transmission wave from the transmission unit 30 in the third direction D3, as illustrated in FIG. 7. In FIG. 7, because the object 3 is present within the detection distance L3, the electronic apparatus 1 receives the reflected wave from the object 3 at the reception unit 40. The electronic apparatus 1 determines the distance from the object 3. The electronic apparatus 1 determines the operation mode having the detection distance that includes the distance to the object 3 and is the shortest. In FIG. 7, the object 3 is located within the detection distances of the short-range radar and the medium-range radar. Thus, the electronic apparatus 1 changes the operation mode to the short-range radar having the shortest detection distance among them and transmits the transmission wave from the transmission unit 30 in the second direction D2 in subsequent frames.

Figure 8:
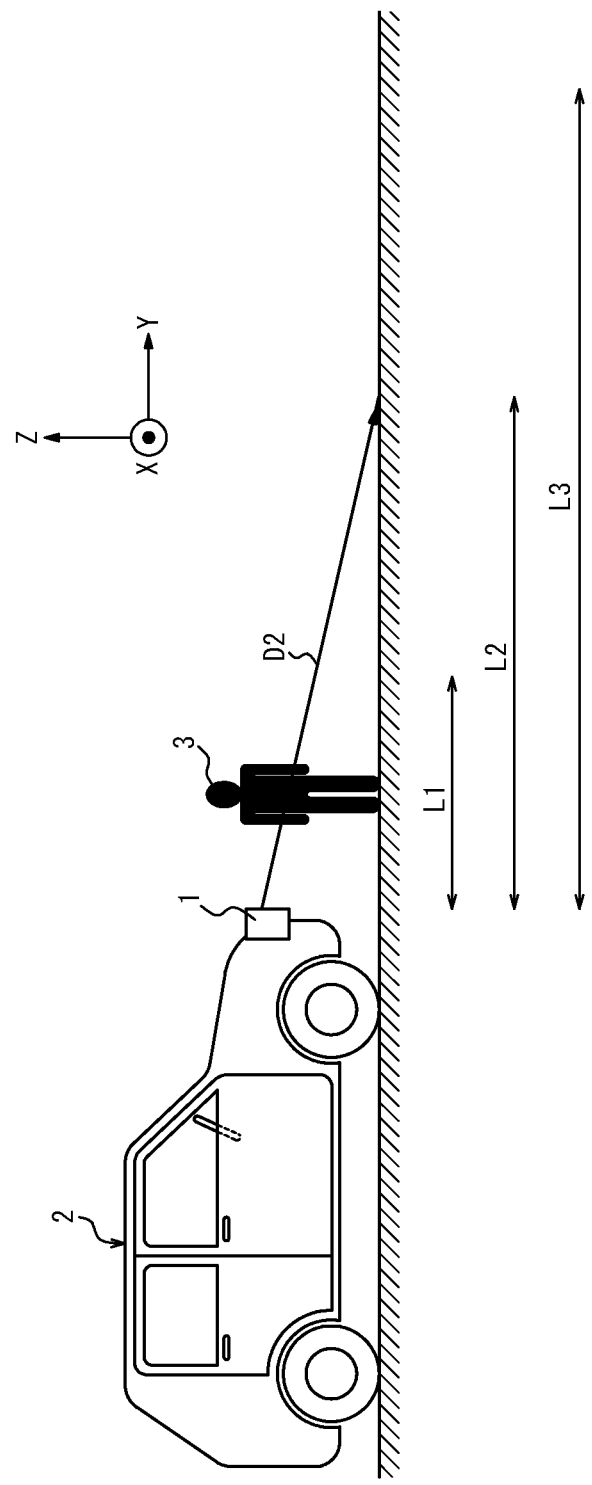
FIG. 8 is a diagram illustrating a flow of an operation of the electronic apparatus according to the embodiment of the present disclosure.

At a third time point, the electronic apparatus 1 transmits the transmission wave from the transmission unit 30 in the second direction D2, as illustrated in FIG. 8. It is assumed that at this time point the object 3 has moved to a location illustrated in FIG. 8. In FIG. 8, because the object 3 is present within the range of the detection distance L2, the electronic apparatus 1 receives the reflected wave from the object 3 at the reception unit 40. The electronic apparatus 1 determines the distance from the object 3. The electronic apparatus 1 determines the operation mode having the detection distance that includes the distance to the object 3 and is the shortest. In FIG. 8, the object 3 is located within the detection distances of the ultra-short-range radar, the short-range radar, and the medium-range radar. Thus, the electronic apparatus 1 changes the operation mode to the ultra-short-range radar having the shortest detection distance among them and transmits the transmission wave in the first direction D1 from the transmission unit 30 in subsequent frames.

Figure 9:
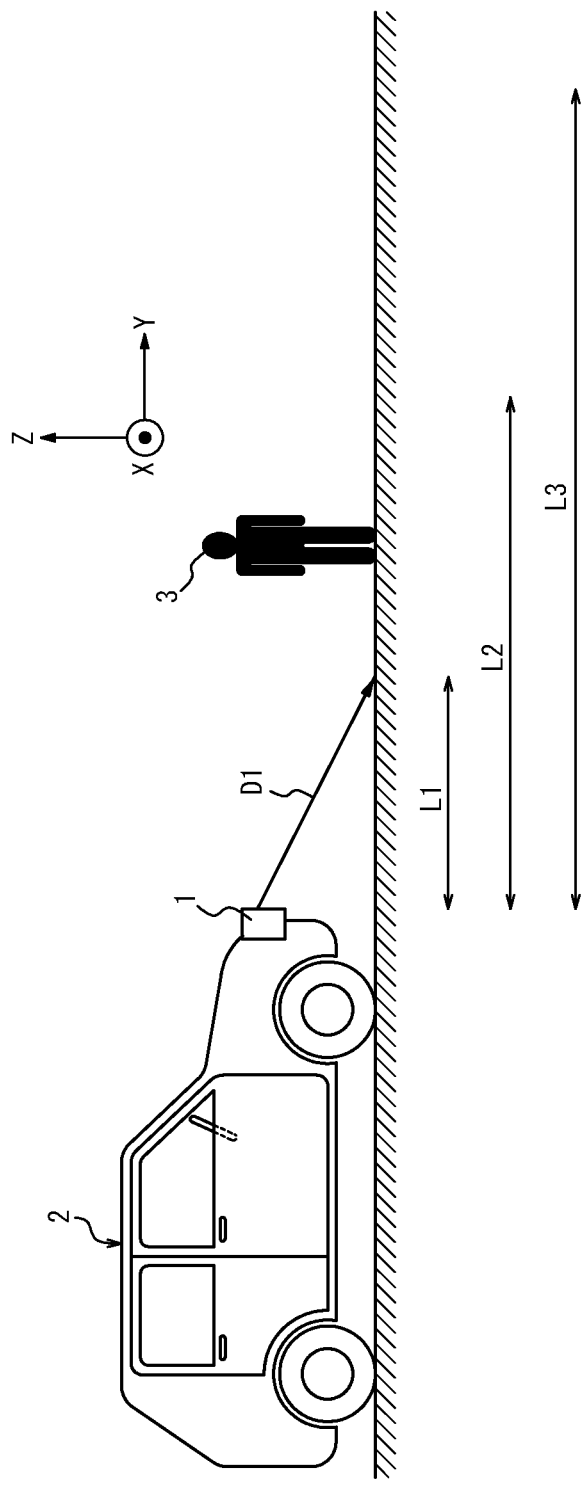
FIG. 9 is a diagram illustrating a flow of an operation of the electronic apparatus according to the embodiment of the present disclosure.

At a fourth time point, the electronic apparatus 1 transmits the transmission wave from the transmission unit 30 in the first direction D1, as illustrated in FIG. 9. It is assumed that at this time point the object 3 has moved to a location illustrated in FIG. 9. In FIG. 9, the object 3 is not present within the detection distance L1. Thus, the electronic apparatus 1 does not receive the reflected wave from the object 3 at the reception unit 40. In this case, the electronic apparatus 1 sets the operation mode to the operation mode of the medium-range radar having the longest detection distance among them and transmits the transmission wave in the third direction D3 from the transmission unit 30 in subsequent frames.

In subsequent frames also, the electronic apparatus 1 transmits the transmission wave from the transmission unit 30 in one of the plurality of operation modes determined based on whether the object 3 is present in a previous frame. When the number of frames reaches the predetermined number, the electronic apparatus 1 may end the transmission of the transmission wave.

Example Operation of Electronic Apparatus

Figure 10:
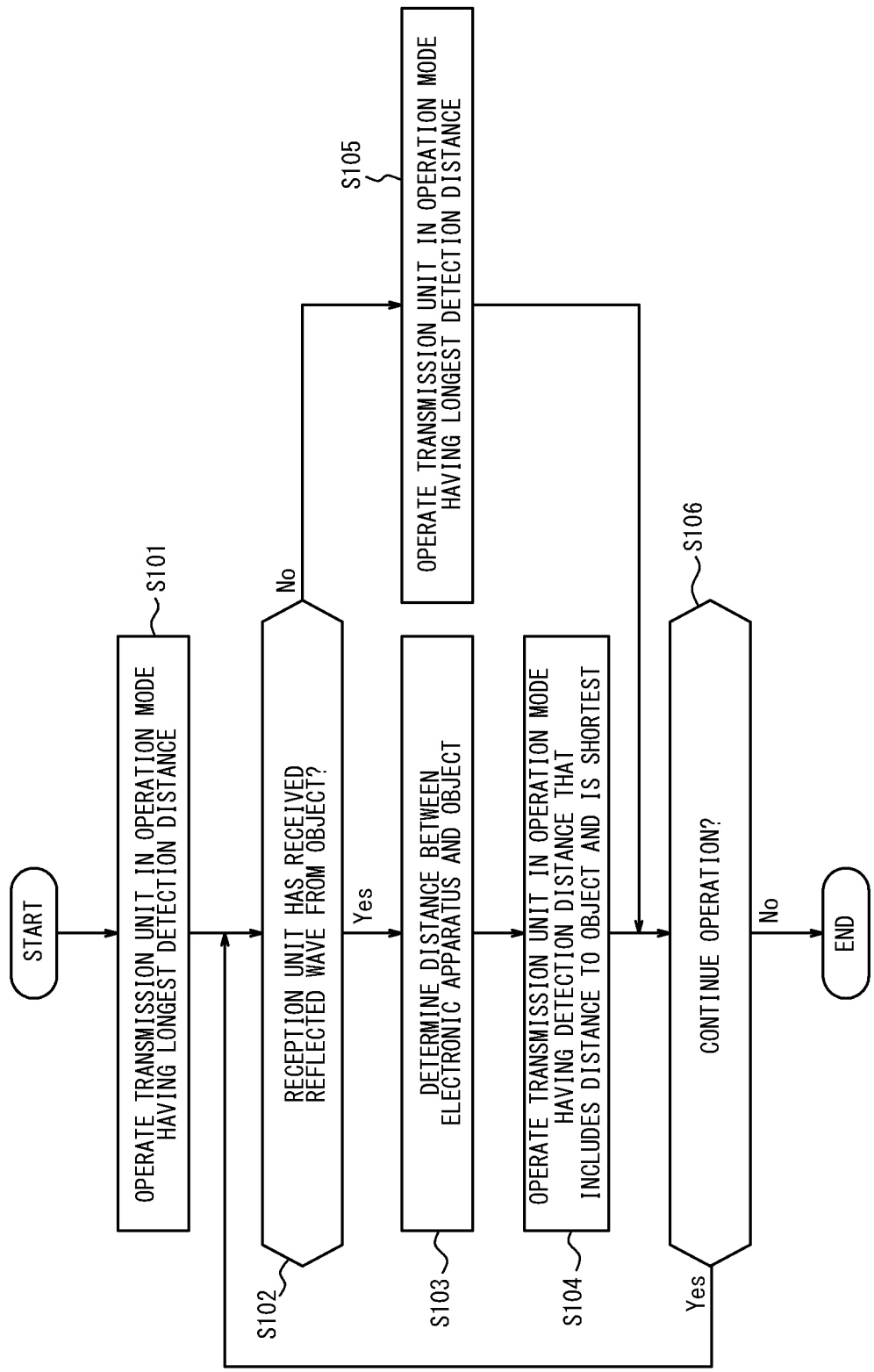
FIG. 10 is a flowchart illustrating an operation of the electronic apparatus according to the embodiment of the present disclosure.

A flow of the operation of the electronic apparatus 1 according to the embodiment of the present disclosure will be described with reference to FIG. 10. The operation illustrated in FIG. 10 may be started under any conditions including reception of a user operation by the input interface 80 or activation of the electronic apparatus 1.

Step S101: The controller 10 operates the transmission unit 30 in the operation mode having the longest detection distance.

Step S102: The controller 10 determines whether the reception unit 40 has received the reflected wave from the object 3.

Step S103: When the controller 10 determines that the reception unit 40 has received the reflected wave from the object 3 (Yes in step S102), the controller 10 determines the distance between the electronic apparatus 1 and the object 3.

Step S104: The controller 10 operates the transmission unit 30 in the operation mode having the detection distance that includes the distance to the object 3 and is the shortest.

Step S105: When the controller 10 determines that the reception unit 40 has not received the reflected wave from the object 3 (No in step S102), the controller 10 operates the transmission unit 30 in the operation mode having the longest detection distance.

Step S106: The controller 10 determines whether to continue the operation. When the controller 10 determines to continue the operation (Yes in step S106), the controller 10 repeats the process in step S102. When the controller 10 determines to not continue the operation (No in step S106), the controller 10 ends the operation.

As described above, the electronic apparatus 1 according to the present embodiment includes the transmission unit 30, the reception unit 40, and the controller 10. The transmission unit 30 transmits the transmission wave. The reception unit 40 receives the reflected wave of the transmission wave reflected by the object. The controller 10 operates the transmission unit 30 in one of the plurality of operation modes having different detection distances. When the reception unit 40 receives the reflected wave, the controller 10 determines the distance between the electronic apparatus 1 and the object 3, based on the transmission wave and the reflected wave. When the reception unit 40 receives the reflected wave, the controller 10 operations the transmission unit 30 in the operation mode having the detection distance that includes the distance to the object 3 and is the shortest, from among the plurality of operation modes. The electronic apparatus 1 configured as described above can operate the transmission unit 30 to transmit the transmission wave in an operation mode selected according to the distance to the object 3. Thus, the electronic apparatus 1 can operate in the operation mode having a higher resolution, from among the operation modes having the detection distances capable of detecting the object 3, and the usefulness of the technique for detecting an object using radio waves is improved.

When the reception unit 40 does not receive the reflected wave, the controller 10 of the electronic apparatus 1 according to the present embodiment may operate the transmission unit 30 in the operation mode having the longest detection distance, from among the plurality of operation modes. Thus, when the object 3 is not detected in the current operation mode, the electronic apparatus 1 can operate in the operation mode having a wider range capable of detecting the object 3, and the usefulness of the technology for detecting an object using the radio waves is improved.

The controller 10 of the electronic apparatus 1 according to the present embodiment may determine whether the reception unit 40 has received the reflected wave, at a predetermined timing. In this configuration, after the controller 10 operates the transmission unit 30, the controller 10 can determine whether the current operation mode is appropriate to detect the object 3. Thus, the usefulness of the technology for detecting an object using the radio waves is improved.

The transmission unit 30 of the electronic apparatus 1 according to the present embodiment may include a plurality of transmission antennas 36. The controller 10 may control the plurality of transmission antennas 36 according to the operation mode of the transmission unit 30 to control the directivity of the transmission wave transmitted from the transmission unit 30. Thus, the controller 10 can control the directivity of the transmission wave that differs between the plurality of operation modes of the transmission unit 30. For example, the controller 10 can control the directivity of the transmission wave to improve a detection accuracy of the object 3 in each of the different operation modes of the transmission unit 30. Further, the controller 10 can control the directivity of the transmission wave to reduce electric power necessary for the transmission of the transmission wave in each of the different operation modes of the transmission unit 30.

The controller 10 of the electronic apparatus 1 according to the present embodiment may control the directivity of the transmission wave, such that the shorter the detection distance of the operation mode, the larger the angle in the downward direction with respect to the horizontal direction. Thus, the controller 10 can improve the detection accuracy of the object 3 present at a location lower than the electronic apparatus 1.

The plurality of transmission antennas 36 of the electronic apparatus 1 according to the present embodiment may be arranged side by side in the vertical direction. The controller 10 may control the directivity of the transmission wave by performing beamforming in the downward direction with respect to the horizontal direction by controlling at least one phase of the transmission waves transmitted from the plurality of transmission antennas 36. Thus, the directivity of the transmission wave transmitted from the transmission unit 30 can be changed by changing the information and the program used for the beamforming, without physically changing an installation location, orientation or the like of the transmission antenna 36.

Although the disclosure has been described based on the figures and the embodiments, it is to be understood that various changes and modifications may be implemented based on the present disclosure by those who are ordinarily skilled in the art. Accordingly, such changes and modifications are included in the scope of the disclosure herein. For example, a function and the like included in each unit may be rearranged without logical inconsistency. A plurality of units or the like can be combined together or subdivided. Also, each of the above embodiments does not need to be practiced strictly following the description thereof but may be implemented by appropriately combining or partially omitting features. That is, the contents of the present disclosure can be altered or modified by those skilled in the art, based on the present disclosure. Thus, such alterations and modifications are included in the scope of the disclosure herein. For example, each functional unit, means, step, or the like in each embodiment may be added to another embodiment or substitute each functional unit, means, step, or the like of another embodiment, without logical inconsistency. In each embodiment, each of a plurality of functional units, means, steps, or the like may be combined together or subdivided. Further, each of the embodiments of the present disclosure described above does not need to be practiced strictly following the description thereof but may be implemented by appropriately combining or partially omitting features.

Figure 11:
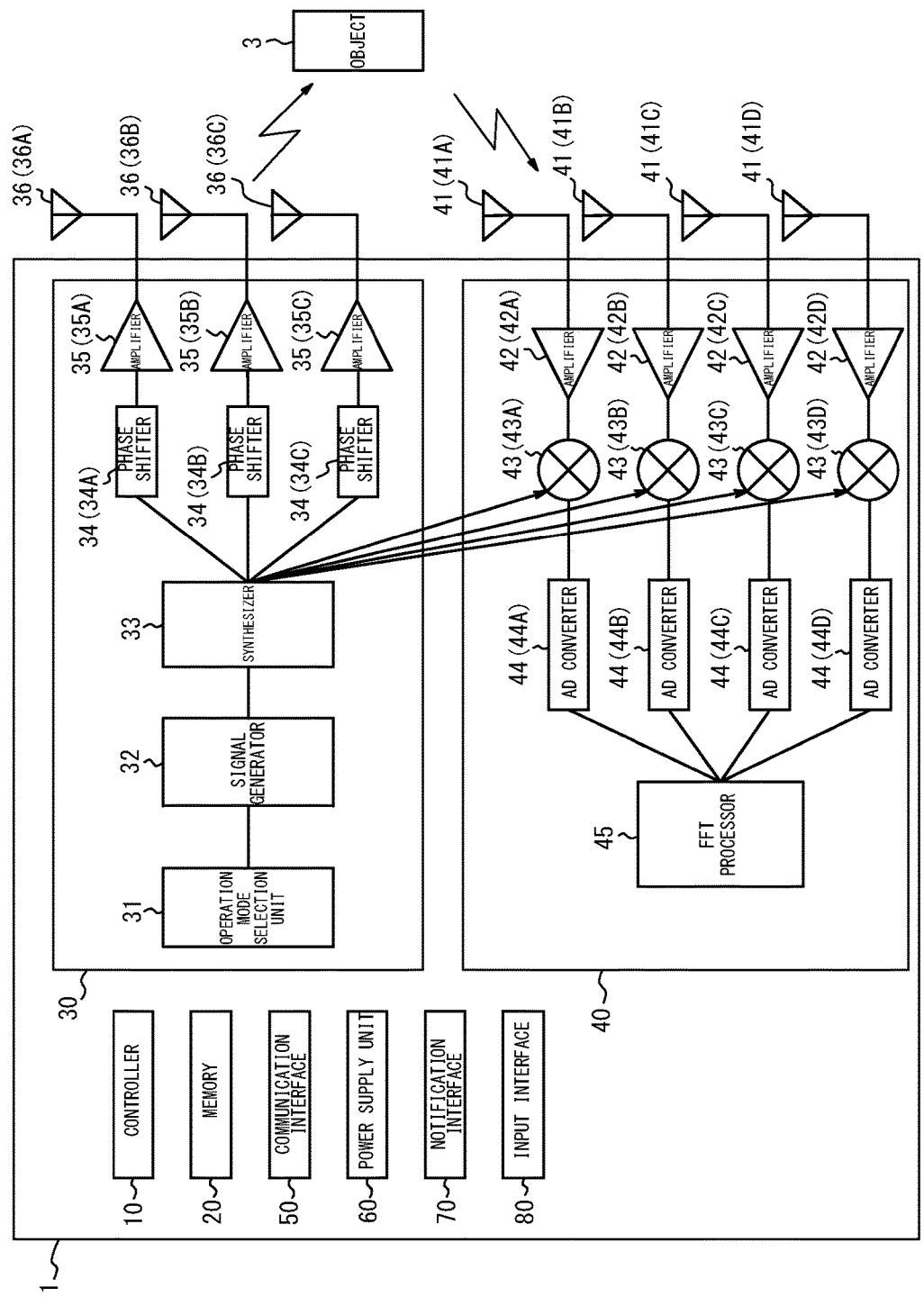
FIG. 11 is a schematic diagram illustrating a configuration of an electronic apparatus according to another embodiment of the present disclosure.

For example, although in the present disclosure the electronic apparatus 1 has been described to have two transmission antennas, this is not restrictive. For example, FIG. 11 and FIG. 12 respectively illustrate a configuration diagram of the electronic apparatus 1 and a layout of antennas in a case in which the electronic apparatus 1 includes three transmission antennas 36A, 36B, and 36C. The three transmission antennas 36A, 36B, and 36C may be arranged having the respective directivities of the transmission waves associated with the operation modes of the ultra-short-range radar, the short-range radar, and the medium-range radar. In particular, the three transmission antennas 36A, 36B and 36C may be arranged having the respective directivities of the transmission waves in the first direction D1, the second direction D2, and the third direction D3 illustrated in FIG. 4.

In the electronic apparatus 1 having the above configuration, when the transmission wave is transmitted by the ultra-short-range radar, the controller 10 transmits the transmission wave in the first direction D1 from the transmission antenna 36A. When the transmission wave is transmitted by the short-range radar, the controller 10 transmits the transmission wave in the second direction D2 from the transmission antenna 36B. When the transmission wave is transmitted by the medium-range radar, the controller 10 transmits the transmission wave in the third direction D3 from the transmission antenna 36C.

As described above, the plurality of transmission antennas 36 of the electronic apparatus 1 may be arranged having different directivities of the transmission waves. The controller 10 may control the directivity of the transmission wave by transmitting the transmission wave in the downward direction with respect to the horizontal direction from one of the plurality of transmission antennas 36. By using the plurality of transmission antennas 36 having different directivities of the transmission waves mechanically set as described above, a processing amount and time necessary for the operation by the controller 10 to change the directivity of the transmission wave can be reduced.

For example, although in the present disclosure the electronic apparatus 1 that operates the transmission unit 30 in a plurality of operation modes having different detection distances has been described, this is not restrictive. The electronic apparatus 1 may operate the transmission unit 30 in a plurality of operation modes having different transmission angles of the transmission waves. The transmission angle may be an angle at which the transmission wave spreads in the horizontal direction. For example, the transmission angle may be represented by a central angle of the target space 4 expanding in the fan shape in FIG. 1. In this case, the controller 10 operates the transmission unit 30 in one of the plurality of operation modes having different detection angles. When the reception unit 40 receives the reflected wave, the controller 10 determines an angle between the electronic apparatus 1 and the object, based on the transmission wave and the reflected wave. The controller 10 operates the transmission unit in the operation mode having the detection angle that includes the angle between the electronic apparatus 1 and the object and is the smallest, from among the plurality of operation modes. When the reception unit 40 does not receive the reflected wave, the controller 10 operates the transmission unit 30 in the operation mode having the widest detection angle, from among the plurality of operation modes.

The embodiments described above are not restricted to be implemented as the electronic apparatus 1. For example, the embodiments described above may be implemented as a control method for an apparatus such as the electronic apparatus 1. Further, the embodiment described above may be implemented as a control program for an apparatus such as the electronic apparatus 1.

The invention claimed is:

1. An electronic apparatus comprising:
a transmission unit configured to transmit a transmission wave;
a reception unit configured to receive a reflected wave of the transmission wave reflected by an object; and
a controller configured to operate the transmission unit in one of a plurality of operation modes having different detection distances,
wherein the controller is configured to
when the reception unit receives the reflected wave, determine a distance between the electronic apparatus and the object, based on the transmission wave and the reflected wave,
select an operation mode from among a plurality of operation modes that are capable of detecting the object at the distance detected from the electronic apparatus, and
operate the transmission unit in the operation mode having the detection distance that includes the distance to the object and is the shortest detection distance from among detection distances of the plurality of operation modes.

2. The electronic apparatus according to claim 1, wherein, when the reception unit does not receive the reflected wave, the controller is configured to operate the transmission unit in an operation mode having a longest detection distance, from among the plurality of operation modes.

3. The electronic apparatus according to claim 1, wherein the controller is configured to determine whether the reception unit has received the reflected wave, at a predetermined timing.

4. The electronic apparatus according to claim 1, wherein the transmission unit includes a plurality of transmission antennas, and
the controller is configured to control the plurality of transmission antennas according to the operation mode of the transmission unit and control a directivity of a transmission wave transmitted from the transmission unit.

5. The electronic apparatus according to claim 4, wherein the controller is configured to control the directivity of the transmission wave such that the shorter a detection distance of the operation mode, the larger an angle in a downward direction with respect to a horizontal direction.

6. The electronic apparatus according to claim 5, wherein the plurality of transmission antennas are arranged side by side in a vertical direction, and
the controller is configured to control the directivity of the transmission wave by controlling at least one phase of transmission waves transmitted from the plurality of transmission antennas for beamforming in a downward direction with respect to the horizontal direction.

7. The electronic apparatus according to claim 5, wherein the plurality of transmission antennas are arranged having different directivities of the transmission waves, and
the controller is configured to control the directivity of the transmission wave by transmitting the transmission wave in a downward direction from the horizontal direction from one of the plurality of transmission antennas.

8. A control method to be executed by an electronic apparatus that includes a transmission unit, a reception unit, and a controller, the control method comprising:

transmitting a transmission wave from the transmission unit in one of a plurality of operation modes having different detection distances;

determining whether the reception unit has received a reflected wave of the transmission wave reflected by an object;

when the reception unit receives the reflected wave, determining a distance between the electronic apparatus and the object, based on the transmission wave and the reflected wave; and when the reception unit receives the reflected wave, selecting an operation mode from among a plurality of operation modes that are capable of detecting the object at the distance detected from the electronic apparatus, and operating the transmission unit in the operation mode having the detection distance that includes the distance to the object and is the shortest detection distance from among detection distances of the plurality of operation modes.

9. A non-transitory computer-readable medium storing a control program for causing an electronic apparatus that includes a transmission unit, a reception unit, and a controller, to execute the steps of:

transmitting a transmission wave from the transmission unit in one of a plurality of operation modes having different detection distances;

determining whether the reception unit has received a reflected wave of the transmission wave reflected by an object;

when the reception unit receives the reflected wave, determining a distance between the electronic apparatus and the object, based on the transmission wave and the reflected wave; and when the reception unit receives the reflected wave, selecting an operation mode from among a plurality of operation modes that are capable of detecting the object at the distance detected from the electronic apparatus, and operating the transmission unit in the operation mode having the detection distance that includes the distance to the object and is the shortest detection distance from among detection distances of the plurality of operation modes.

* * * * *